Dec. 28, 1954    A. W. GAUBATZ    2,697,907
MULTIPLATE VARIABLE AREA JET NOZZLE
Filed Nov. 12, 1948    3 Sheets-Sheet 2
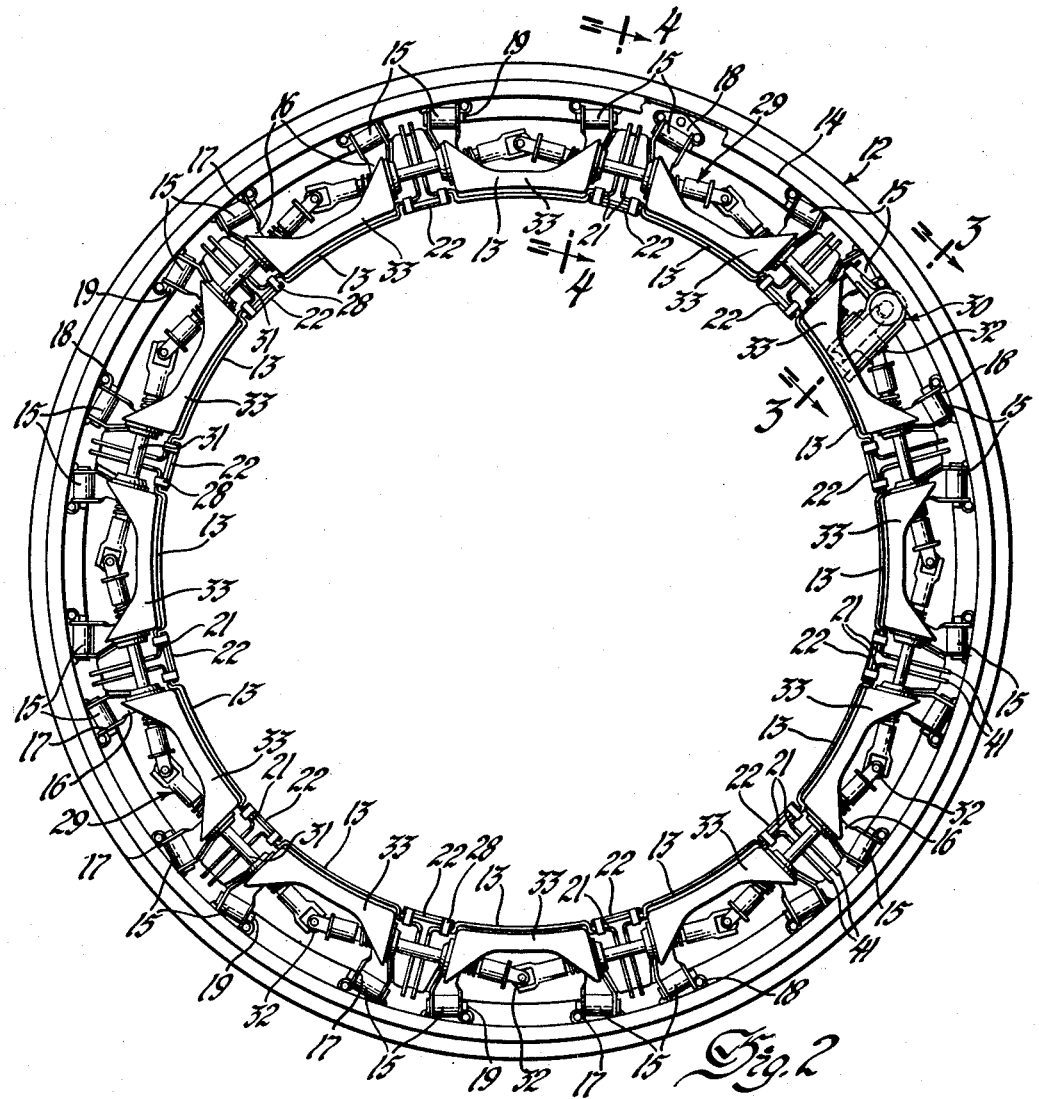
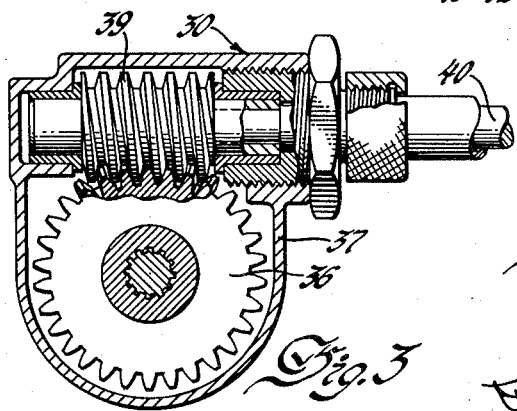
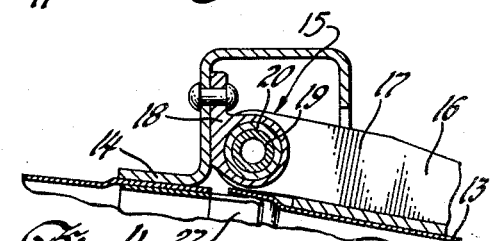
Inventor
Arthur W. Gaubatz
By
Spencer, Willets, Helming & Baillio
Attorneys

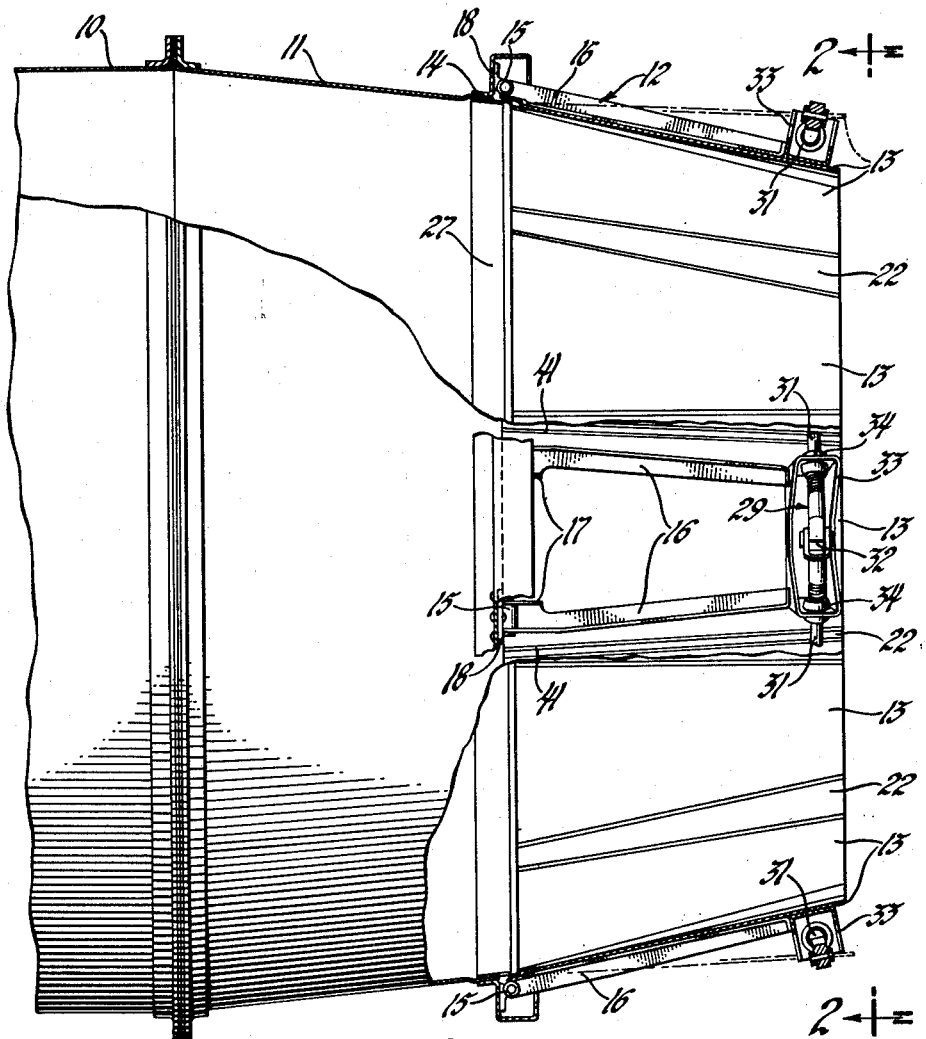

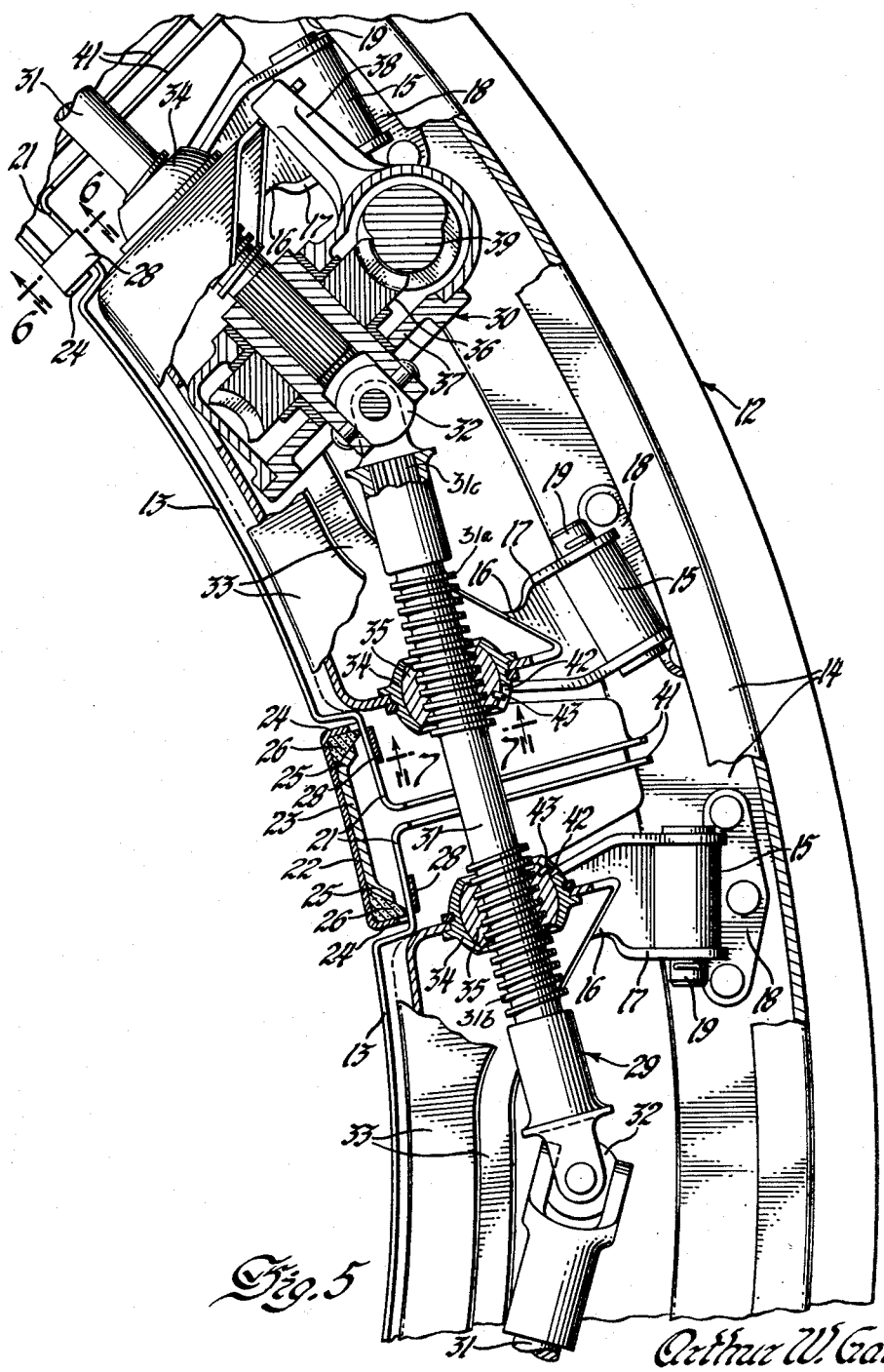

United States Patent Office

2,697,907
Patented Dec. 28, 1954

2,697,907

MULTIPLATE VARIABLE AREA JET NOZZLE

Arthur W. Gaubatz, Indianapolis, Ind., assignor to General Motors Corporation, Detroit, Mich., a corporation of Delaware Application November 12, 1948, Serial No. 70,783

10 Claims. (Cl. 60—35.6)

This invention has to do with jet engines more particularly with variable area jet nozzles for jet engines.

It is an object of this invention to provide a variable area jet nozzle for a jet engine which is of simple construction, which presents a substantially circular jet discharge orifice in all positions to which it may be adjusted, in which leakage of the jet fluid is minimized in all positions to which the nozzle may be adjusted, and which requires the minimum of power to operate. Another object of the invention is to provide operating mechanism for a variable area jet nozzle which imposes the minimum strain on the nozzle at critical points and may be easily cooled.

For a better understanding of the objects and nature of this invention reference is made to the following specification and the accompanying drawing wherein there is described and illustrated the preferred embodiment of the invention.

In the accompanying drawing:

Figure 1 is a side elevation with parts broken away and in section of the rear end of a turbo-jet engine equipped with a variable area jet nozzle in accordance with my invention.

Figure 2 is a rear elevation of the variable area jet nozzle shown in Figure 1 taken as indicated by the line 2—2 of Figure 1.

Figure 3 is an enlarged section through an element of the operating mechanism of the nozzle taken as indicated by the line 3—3 of Figure 2.

Figure 4 is an enlarged section through one of the hinges of one of the segments and associated parts of the nozzle taken as indicated by the line 4—4 of Figure 2.

Figure 5 is an enlarged fragmentary view of the nozzle and a portion of its operating mechanism taken as indicated by the line 2—2 of Figure 1 but with parts broken away and in section.

Figure 6 is a fragmentary section through the nozzle taken as indicated by the line 6—6 of Figure 5.

Figure 7 is a view of a portion of the operating mechanism of the nozzle taken as indicated by the line 7—7 of Figure 5.

In the drawing there is shown the rear end of a turbo-jet engine of the type which includes a compressor, one or more combustion chambers to which the compressor supplies air and to which fuel is supplied by suitable equipment, and a turbine which is operated by the gaseous products generated in the combustion chamber or chambers and drives the compressor and whose exhaust gases form the jet which constitutes the propelling force of the engine.

The exhaust gases from the turbine are discharged into the cylindrical tail pipe or exhaust pipe 10 whence they pass into the frusto-conical fixed nozzle section 11 whence they are discharged into the atmosphere through the structure 12 which constitutes a variable area jet nozzle.

The variable area jet nozzle 12 includes a circular ring of tapered, generally stave-like main segments 13 disposed as a coaxial extension of the fixed nozzle section 11 with their wider ends nearer the outer end of the fixed nozzle section. The wider end of each of the main segments 13 is connected to a ring 14, which is mounted on and secured to the outer end of the fixed nozzle section, by two hinges 15 whose axes are disposed at right angles to the axis of the nozzle and parallel to tangents to the surface of the fixed nozzle section so that the narrower, outer ends of the main segments may swing inwardly or outwardly to decrease or increase the area of the opening bounded by their outer ends.

To each of the main segments 13 at a distance from each of its side edges there is secured a stiffening member 16 right angle-shaped in cross section which extends lengthwise of it. The members 16 extend slightly beyond the wider ends of the main segments 13 to which they are secured and on these ends of the members there are formed ears 17 parallel to the upstanding flanges of the members. The ear 17 and upstanding flange on each of the members 16 straddle one of the members 18 which is secured to the ring 14 and with pins 19 which extend through bores in the ears, flanges and members and graphite impregnated iron bushings 20 interposed between the pins and the surfaces of the bores in the members 18 form the hinges 15 which connect the main segments to the ring 14.

The side margins of the main segments 13 beyond the reinforcing members 16 are stepped outwardly to provide at the edges of the main segments offsets 21 tapered in width from their rear to their front ends with outwardly projecting flanges 41 at their outer edges. In each of the recesses formed by an adjacent pair of the offsets 21 is disposed a tapered auxiliary segment 22 to whose outer side is secured a reinforcing member 23 which extends lengthwise of it. On the side edges of the auxiliary segments and reinforcing members are formed flanges 24 and 25 which define channels in which are disposed graphite sealing strips 26 which bear against the offset margins of the main segments. The auxiliary segments, including the sealing strips 26, are made approximately as thick as the depths of the offsets 21 so that the inner surfaces of the auxiliary segments will be approximately flush with the inner surfaces of the main segments. The auxiliary segments are made somewhat wider than the gaps between the main segments when the nozzle is in its open-most position so that they bridge the gaps between the main segments they overlap even when the nozzle is in its open-most position and thus minimize the leakage of jet fluid from the nozzle through the gaps in all positions to which the nozzle may be adjusted. To minimize leakage of the jet fluid through the gap between the outer end of the fixed nozzle section 11 and the inner ends of the main and auxiliary segments, there is provided a sealing strip 27 of which one side is secured to the outer end of the fixed nozzle section and the other side, which is slotted transversely to render it resiliently yieldable, is telescoped within the inner end of the variable area jet nozzle and serves, besides as a sealing strip, to hold the inner ends of the auxiliary segments in place in the recesses in the margins of the main segments in which they are disposed. To hold the outer ends of the auxiliary segments in place in the recesses and permit lateral movement of the main segments with respect to the auxiliary segments when the nozzle is opened and closed and to centralize the auxiliary segments with respect to the gaps between the main segments, there are provided on the outer ends of each of the auxiliary segments two tongues 28 of which each extends outwardly and then over one of the main segments with which the auxiliary segment is associated. Engagement of the tongues 28 with the offsets 21 of flanges 41 on the main segments will prevent uncovering by the auxiliary segments of the gaps between the main segments as the nozzle is opened and tend to centralize the auxiliary segments with respect to the main segments.

To move the outer ends of the main segments and with them the outer ends of the auxiliary segments inwardly and outwardly to vary the area of the opening bounded by the outer end of the variable area nozzle and thus the cross-sectional area of the jet, there is provided what may be called a variable length hoop 29 which encircles the outer end of the variable area nozzle and mechanism 30 for actuating the variable length hoop.

The variable length hoop 29 includes a ring of steel rods 31 disposed end to end with the adjacent ends of the rods interconnected by universal joints 32. On the outer end of each of the main segments beyond the outer ends of the members 16 there is secured a generally trough shaped bracket 33 with end walls in which are mounted cages 34 in which nuts 35 of sintered iron-graphite are mounted so that they may rock to the extent necessary about two right angularly related axes at right angles to the axes of their bores but may rotate about the axes of their bores only to approximately the limited extent necessary to afford them this freedom of movement. To afford them this freedom and restraint of movement the nuts 35 are made of parti-spherical form and seated in parti-spherical seats in the cages 34, the cages 34 are fixed against movement with respect to the brackets 33 and there is provided in each of the cages a notch 42 and on the nut mounted in the cage a pin 43 of smaller transverse dimensions than the notch into which it projects. Each of the rods 31 extends through the nut 35 at one end of one and the nut 35 at the adjacent end of the adjacent bracket and has on it between its middle and one end a hardened left-handed thread 31a which mates with a left-handed thread in one of the nuts and between its middle and its other end a hardened right-handed thread 31b which mates with a right-handed thread in the other nut. To permit variation in the length of the hoop 29 which the rods 31 and universal joints 32 constitute, the forks of the universal joints are slip splined as at 31c to the ends of the rods to which they are connected.

On the shank of one of the forks of one of the universal joints 32 there is mounted a sintered iron-graphite worm wheel 36. The shank of this fork is mounted in bearings in a housing 37 which is restrained from rotation about the axis of the shank by a torque arm 38 which extends into a notch in the adjacent end wall of the bracket 33 in which the housing is disposed. In the housing 37 there is also journalled a hardened thread steel worm 39 which meshes with the worm wheel 36.

The nozzle 12 may be adjusted to vary the cross-sectional area of the opening in its outer end from its minimum diameter in which it is shown in solid lines in the drawing to its maximum diameter in which it is shown in dash and dot lines in Figure 1 and vice versa by rotation of the worm 39 through an operating shaft 40 which extends to a point without the housing 37. Rotation of the worm in one direction moves the main segments 13 apart and outwardly and rotation of the worm in the other direction moves them together and inwardly and thus varies the cross-sectional area of the opening at the outer end of the nozzle while maintaining the opening of substantially circular cross section. The splined connection of the forks of the universal joints 32 to the rods 31, of course, permits the variation in the length of the hoop 29 necessary to accommodate the movements of the main segments apart and outwardly and together and inwardly. The construction and location of the operating mechanism 30 minimizes the operating loads on the hinges 15 and because the operating mechanism is exteriorly located it may easily be cooled.

I claim:

1. In combination, a jet engine having a fixed nozzle section and a variable area jet nozzle therefor comprising a plurality of main segments tapered toward their free ends, an inverted substantially channel-shaped ring member secured to the fixed nozzle section, spaced angularly extending projections secured to said segments, hinge connections between said projections and said ring member to permit adjustment of said segments to vary the area of the variable jet nozzle formed by said segments, auxiliary segments extending between adjacent main segments and bridging the spaces therebetween, and means for simultaneously adjusting said main segments.

2. In combination, a jet engine having a fixed nozzle section and a variable area jet nozzle therefor comprising a plurality of main segments provided with offset side marginal portions, auxiliary segments disposed in said offsets for bridging the space between the adjacent main segments, means for mounting said auxiliary segments for adjusting movement with said main segments and for circumferential lapping movement relative thereto, hinge connections between said main segments and the fixed nozzle section to permit adjustment of said segments to vary the area of the variable jet nozzle, and means for simultaneously adjusting said segments.

3. In combination, a jet engine having a fixed nozzle section and a variable area jet nozzle therefor comprising a plurality of main segments, offsets formed in the side marginal portions of said main segments, hinge connections between said main segments and the fixed nozzle section, channel-shaped auxiliary segments disposed in said offsets for bridging the space between adjacent main segments, channel-shaped reinforcing members secured in the channels of said auxiliary segments, sealing strips located in the space between the adjacent flanges of said channel members and engaging said offsets, and means for simultaneously adjusting said segments.

4. In combination, a jet engine having a fixed nozzle section and a variable area jet nozzle therefor comprising a plurality of segments, hinge connections between said segments and the fixed nozzle section to permit adjustment of said segments to vary the area of the variable jet nozzle, a pair of bracket supported cages carried by each of said segments, right and left-hand threaded nuts rockably mounted in said cages, a rod connecting adjacent segments and having threaded portions mating with the right and left-hand threaded nuts of adjacent sections, universal joints between adjacent rods, one element of each of which has a slip splined connection with an adjacent rod, and means for rotating said rods for simultaneously adjusting said segments.

5. A jet propulsion apparatus comprising, in combination, a thermal jet engine including an exhaust pipe and a variable jet propulsion nozzle at the outlet of the exhaust pipe, the variable jet propulsion nozzle comprising a plurality of overlapping plates articulated to the exhaust pipe for adjustment about axes generally tangential to the exhaust pipe and generally perpendicular to the axis of the exhaust pipe, a flexible sealing ring extending from the outlet of the exhaust pipe into the interior of the variable nozzle into contact with the plates, and means for simultaneously adjusting the plates about their axes of adjustment.

6. A jet propulsion apparatus comprising, in combination, a thermal jet engine including an exhaust pipe and a variable jet propulsion nozzle at the outlet of the exhaust pipe, the variable jet propulsion nozzle comprising a plurality of overlapping plates articulated to the exhaust pipe for adjustment about axes generally tangential to the exhaust pipe and generally perpendicular to the axis of the exhaust pipe, threaded members rockably mounted on each alternate plate, alternate ones of the members being of opposite handed thread, threaded shafts each having two threaded portions of opposite hand engaged respectively in a pair of members on separate plates, means coupling the shafts for concurrent rotation, and means for rotating the shafts.

7. A jet propulsion apparatus comprising, in combination, a thermal jet engine including an exhaust pipe and a variable jet propulsion nozzle at the outlet of the exhaust pipe, the variable jet propulsion nozzle comprising a plurality of main plates hinged to the exhaust pipe for adjustment about axes generally tangential to the exhaust pipe and generally perpendicular to the axis of the exhaust pipe, a plurality of intermediate plates, each intermediate plate being movable with a pair of adjacent main plates and bridging the space between the main plates, and means for simultaneously adjusting the main plates about their axes of adjustment.

8. A jet propulsion apparatus comprising, in combination, a thermal jet engine including an exhaust pipe and a variable jet propulsion nozzle at the outlet of the exhaust pipe, the variable jet propulsion nozzle comprising a plurality of main plates hinged to the exhaust pipe for adjustment about axes generally tangential to the exhaust pipe and generally perpendicular to the axis of the exhaust pipe, a plurality of intermediate plates, each intermediate plate being mounted on and movable with a pair of adjacent main plates and bridging the space between the main plates, and means for simultaneously adjusting the main plates about their axes of adjustment.

9. A jet propulsion apparatus comprising, in combination, a thermal jet engine including an exhaust pipe and a variable jet propulsion nozzle at the outlet of the exhaust pipe, the variable jet propulsion nozzle comprising a plurality of main plates articulated to the exhaust pipe for adjustment about axes generally tangential to the exhaust pipe and generally perpendicular to the axis of the exhaust pipe, a plurality of intermediate plates, each intermediate plate being movable with a pair of adjacent main plates and bridging the space between the main plates, a threaded member on each main plate, a threaded shaft engaged in each threaded member and extending into a threaded member on an adjacent main plate, alternate ones of the members being of opposite handed thread, means coupling the shafts for concurrent rotation, and means for rotating the shafts.

10. A jet propulsion apparatus comprising, in combination, a thermal jet engine including an exhaust pipe and a variable jet propulsion nozzle at the outlet of the exhaust pipe, the variable jet propulsion nozzle comprising a plurality of main plates articulated to the exhaust pipe for adjustment about axes generally tangential to the exhaust pipe and generally perpendicular to the axis of the exhaust pipe, a plurality of intermediate plates, each intermediate plate being movable with a pair of adjacent main plates and bridging the space between the main plates, a threaded member on each main plate, alternate ones of the members being of opposite handed thread, threaded shafts each having two threaded portions of opposite hand engaged respectively in the members of adjacent main plates, there being one shaft for each pair of plates, means coupling the shafts for concurrent rotation, and means for rotating the shafts.

References Cited in the file of this patent

UNITED STATES PATENTS

| Number | Name | Date |
|---|---|---|
| 186,310 | Curtis | Jan. 16, 1877 |
| 2,338,449 | Malczewski | Jan. 4, 1944 |
| 2,397,998 | Goddard | Apr. 9, 1946 |
| 2,424,335 | Scrymgeour | July 22, 1947 |
| 2,462,953 | Eaton et al. | Mar. 1, 1949 |
| 2,496,509 | Wolf | Feb. 7, 1950 |
| 2,551,372 | Haltenberger | May 1, 1951 |
| 2,575,682 | Price | Nov. 20, 1951 |
| 2,597,253 | Melchior | May 20, 1952 |

FOREIGN PATENTS

| Number | Country | Date |
|---|---|---|
| 480,478 | Great Britain | Feb. 23, 1938 |
| 588,501 | Great Britain | May 27, 1947 |

OTHER REFERENCES

Ser. No. 412,526, Malczewski (A. P. C.), publ. June 8, 1943 (corresponds to U. S. Pat. No. 2,338,449).